United States Patent [19]

Berry

[11] Patent Number: 4,840,194

[45] Date of Patent: Jun. 20, 1989

[54] EXPLOSION PROOF ELECTRICAL CONDUIT SEALING FITTING

[75] Inventor: Richard C. Berry, Camillus, N.Y.

[73] Assignee: Cooper Industries, Inc., Houston, Tex.

[21] Appl. No.: 143,871

[22] Filed: Jan. 14, 1988

[51] Int. Cl.$^4$ .................................. F16L 9/22
[52] U.S. Cl. ............................ 138/155; 138/109; 138/159; 138/160; 285/383; 285/420; 174/84 S; 174/92; 174/94 S
[58] Field of Search ............... 138/110, 155, 120, 128, 138/157, 159, 109, 160; 285/406, 401, 412, 420, 373; 174/21 JS, 84 S, 91, 92, 94 S

[56] References Cited

U.S. PATENT DOCUMENTS

| | | | |
|---|---|---|---|
| 866,395 | 9/1907 | Skinner | 285/373 |
| 880,813 | 3/1908 | Nailler | 285/373 |
| 1,514,803 | 11/1924 | Souter et al. | 285/420 X |
| 1,948,274 | 2/1934 | McMurray | 285/373 |
| 2,060,745 | 11/1936 | Pettee | 174/92 |
| 2,139,125 | 12/1938 | Hixon | 174/91 |
| 2,142,452 | 1/1939 | Merrill | 285/373 |
| 2,338,307 | 1/1944 | Staggers | 285/373 |
| 2,867,680 | 1/1959 | Stecher | 174/92 |
| 3,954,288 | 5/1976 | Smith | 285/373 |
| 4,576,401 | 3/1986 | Harrison | 285/373 X |

Primary Examiner—James E. Bryant, III
Attorney, Agent, or Firm—Nelson A. Blish; Eddie E. Scott; Alan R. Thiele

[57] ABSTRACT

An explosion-proof electrical conduit sealing fitting for threadedly engaging at least two threaded conduits and surrounding at least one conductor running through two threaded conduits includes a first element having a portion threadedly engaging at least one of at least two threaded conduits; a second element having a portion threadedly engaging at least one of the at least two threaded conduits, and connections for the first element and the second element. When properly connected and screwed into place, the sealing fitting of the present invention completely surrounds the at least one conductor and threadedly engages all of at least two threaded conduits.

1 Claim, 2 Drawing Sheets

EXPLOSION PROOF ELECTRICAL CONDUIT SEALING FITTING

BACKGROUND OF THE INVENTION

1. Field of the Invention

This invention relates to seals and, more particularly, to electrical conduit sealing fittings.

2. Description of Related Art

Seals are provided in conduit and cable systems to minimize the passage of gases and vapors and prevent the passage of flames therethrough.

Various requirements concerning seals are set forth in Article 501, Section 501-5, of the National Electric Code. One such requirement is that all fittings in Class 1, Division 1 (hazardous) applications must have threaded engagement with its mating conduit. Another requirement is that the seal be filled with a sealing compound. The compounds used in explosion-proof sealing fittings must resist the force of an explosion in the conduit system that could reach several thousand psi. The compounds must also be dense enough to minimize the passage of gases from one part of the conduit system to another. Still further, they must be highly resistant to a great variety of solvents and chemicals. Typically, sealing compound is poured into place, whereupon it solidifies and becomes very hard.

The various requirements discussed above for sealing fittings in Class 1, Division 1 (hazardous) applications make them very difficult to remove. When an occasion arises which requires such a seal to be removed (such as adding or replacing the wires in the conduit) it is common to break or cut open the sealing fitting, crumple the hard compound, pull all the wires out of the conduit, install a new fitting, repull the wires and pour new compound. Often more than one seal is involved in a single run of conduit. This type of work is very time consuming and expensive in direct labor and materials, as well as being costly in terms of system down time. Based on the foregoing, it should be clear that a need has developed for a sealing fitting that would allow a seal to be replaced in location such as hazardous Class 1, Division 1, locations without removing all the electrical conductors or deenergizing the electrical system.

SUMMARY OF THE INVENTION

Such an explosion proof electrical conduit sealing fitting is supplied by the present invention. The fitting of the present invention is employable to threadedly engage at least two threaded conduits and surround at least one conductor running through the at least two threaded conduits. The fitting includes a first element having portions threadedly engaging one of the at least two threaded conduit, a second element having portions threadedly engaging at least one of the at least two threaded conduit, and means for connnecting the first element to the second element. When properly connected, the first and second elements completely surround said at least one conductor and threadedly engage all of at least two threaded conduits. Both the first and second elements may further comprise connectable sub-element body parts, which can be connected around a conductor and threadedly engaged to a conduit. In such a case, the fitting is split crosswise as well as lengthwise. This embodiment of the present invention allows fit up with only one thread at a time which makes it a preferred embodiment.

Accordingly, it is a primary object of the present invention to provide a sealing fitting that can rapidly replace a removed seal.

It is another object of the present invention to provide a sealing fitting that does not require that conductors be disconnected or pulled out of the system prior to effecting replacement.

It is yet another object of the present invention to provide a sealing fitting that is suitable for Division 1, Class 1 (hazardous) applications.

It is still yet another object of the present invention to provide a means for seal replacement that does not necessarily necessitate power disconnection.

Other objects, advantages and new features of the invention will become apparent from the following detailed description of the invention when considered in conjunction with the accompanying drawings wherein:

DETAILED DESCRIPTION OF THE INVENTION

Figure 2:
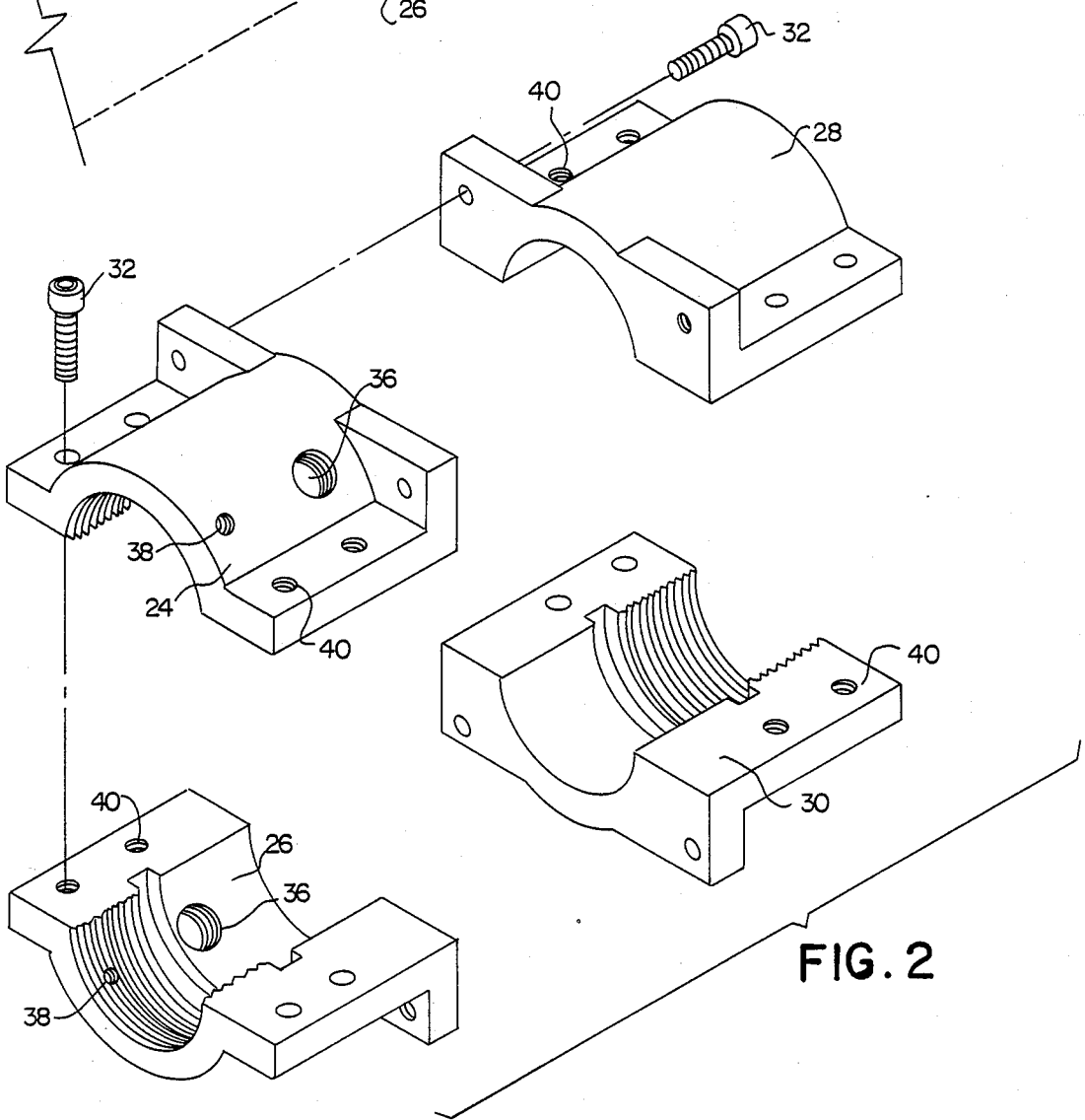
FIG. 2 is an exploded view of the sealing fitting of FIG. 1.
Figure 3:
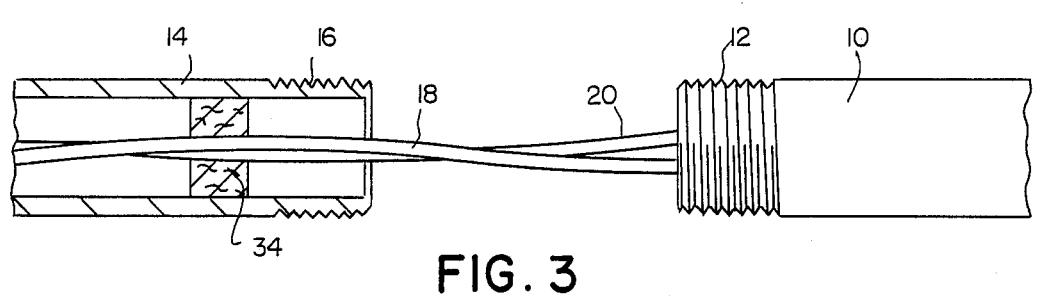
FIG. 3 is a partial cross-sectional view of an environment in which a sealing fitting according to the present invention may operate.

Referring now to the drawings and, in particular, to FIG. 3, it can be seen that a typical environment in which it is frequently desired to employ a sealing fitting comprises a first conduit section 10 having a threaded portion 12 and a second conduit section 14 having a threaded portion 16. Assuming, as in the present invention, portions 12 and 16 can threadedly engage a sealing fitting, such an arrangement could satisfy the requirements for Class 1, Division 1 (hazardous) applications as set forth in the National Electric Code. Referring still further to FIG. 2, it can also be seen that at least one conductor 18 (a second conductor 20 is also shown) runs through and between conduits sections 10, 14.

Figure 1:
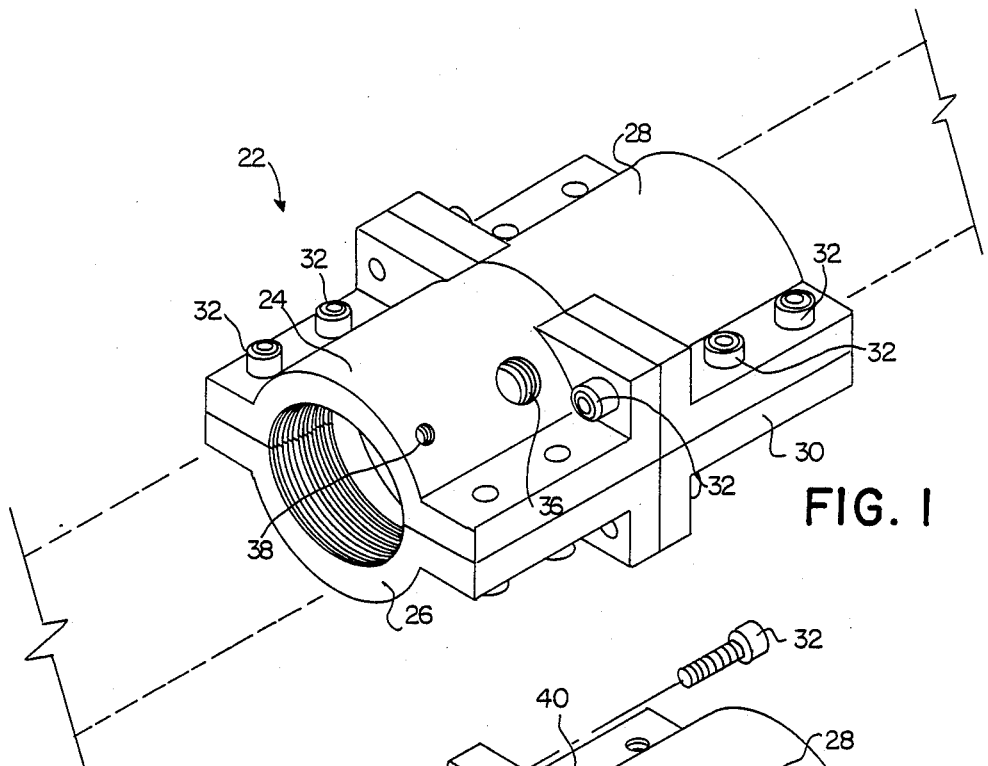
FIG. 1 is a perspective view of a sealing fitting according to the present invention.

Referring now to FIG. 1, a preferred sealing fitting 22 according to the present invention is shown therein. Fitting 22 comprises four sub-elements 24, 26, 28, 30 which are connected by suitable means such as bolts 32. In the specific embodiment illustrated, each of the four sub-elements 24, 26, 28, 30 are virtually identical. This facilitates manufacture of the fitting 22. Also in the specific embodiment illustrated, each sub-element is directly connected to only two of the other sub-elements (e.g., sub-element 24 is directly connected to sub-elements 26 and 28 but not sub-element 30) but, as should be readily apparent, the totality of such connections forms a single fitting 22.

An important aspect of the present invention is that it can be threadedly engaged to at least two conduits with requiring that any action be taken with respect to any conductor running through and between the conduits. Only two elements are required to accomplish this. For example, with reference to the embodiment of the present invention shown in the drawing, sub-elements 24 and 28, suitably connected, could be considered to be a single element. Likewise. sub-elements 26 and 30, suitably connected, could be considered to be a single element. As should be readily apparent to those skilled in the art, a fitting comprising an element 24/28 and an element 26/30 could be threadedly engaged to at least two conduits so as to completely surround a conductor running therethrough. Of course, the fitting of the present invention may comprise any number of elements and/or sub-elements (e.g. two, as described above; four, as shown in the drawings; or virtually any other number greater than two) limited only by the requirement that the important aspect mentioned above is exhibited by a constructable fitting.

The present invention further comprises means for connecting the elements and/or sub-elements described above. Bolts 32 are one such means. Those skilled in the art are well aware of other possibilities and the present invention should be held to encompass all such possibilities.

Referring to FIG. 3, damming material such as CHICO material which is produced by the Assignee of the present invention, is shown installed in conduit 14. Recognized that it is standard, if not NEC prescribed, practice to fill sealing fittings with damming material, a refinement of the present invention is the presence of openings, such as openings 36 in one or more of the sub-elements to allow damming material to be poured therethrough. Other holes, such as holes 38, may be created for other purposes, such as holding a set screw for electrical bonding.

It should be obvious to those skilled in the art how to produce the various elements of the present invention. Properties of the materials used may have to meet NEC standards. Paths through which flames could pass could not be tolerated in fittings for use in hazardous locations. Machining techniques for preparing such portions as threaded bolt 32 receiving holes 40 are also well known to those skilled in the relevant art.

Figure 4:
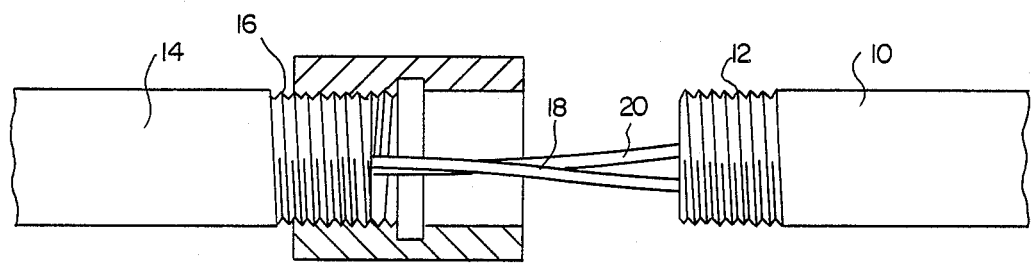
FIGS. 4, 5 and 6 show the sealing fitting of FIG. 1 in various stages of assembly in an environment for operation.
Figure 5:
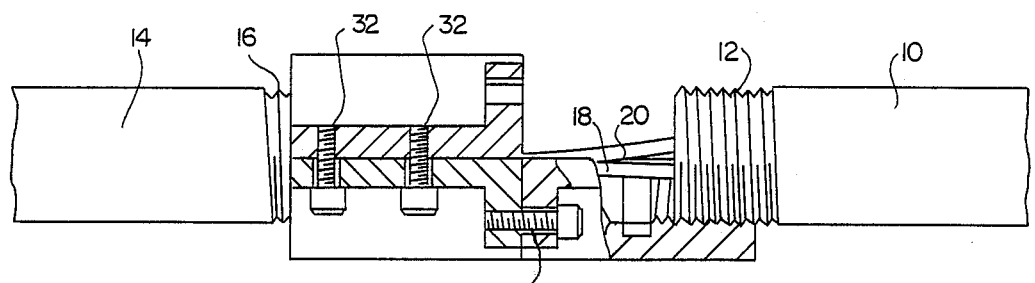
Figure 6:
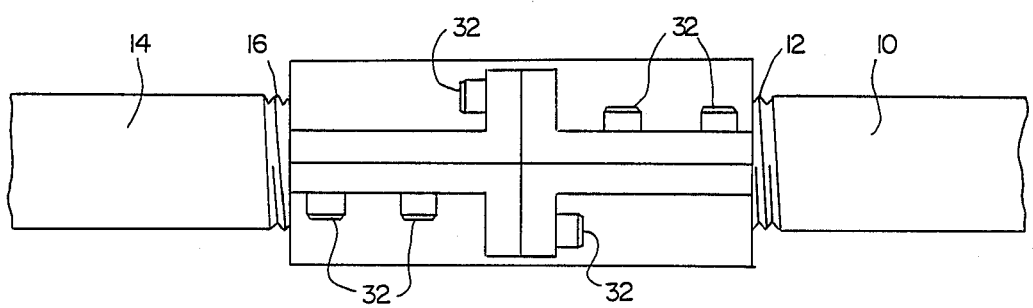

Installation of an embodiment of the sealing fitting of the present invention is progressively shown in FIGS. 4, 5, and 6. In FIG. 4, one of the four sub-elements is shown installed in a two conduit/two conductor environment. In FIG. 5, three of the four sub-elements, in cross-sections, are shown installed. In FIG. 6, a sealing fitting according to the present invention is shown completely connected and installed. As the embodiment of the present invention is split crosswise as well as lengthwise, it should be readily apparent to those skilled in the art that fit up with only on thread at a time is possible. This characteristic of the present invention makes it much better than any fitting which requires fit up of more than one thread at a tine, which in environments such as the environment of FIG. 3, wherein the conduits 14, 10 are frequently immobile, is virtually impossible.

Obviously, numerous modifications and variations of the present invention are possible in light of the above teachings. It is therefore to be understood that, within the scope of the appended claims, the present invention may be practiced otherwise than as specifically described hereinabove.

I claim:

1. An explosion-proof electrical conduit sealing fitting for threadedly engaging at least two threaded conduits and surrounding at least one conductor running through said at least two threaded conduits, said fitting comprising:
   a first sub-element having a portion threadedly engaging a portion of at least one of said at least two threaded conduits;
   a second sub-element having a portion threadedly engaging at least a portion of one of said at least two threaded conduits;
   means for connecting said first sub-element to said second sub-element;
   a third sub-element having a portion threadingly engaging a portion of at least one of said at least two threaded conduits;
   a fourth sub-element having a portion threadingly engaging a portion of at least one of said at least two threaded conduits;
   means for connecting said third sub-element to said fourth sub-element;
   said first, second, third and fourth sub-elements being substantially identical;
   means for connecting said first sub-element to said third sub-element; and
   means for connecting said second sub-element to said fourth sub-element;
   whereby said connected first, second, third and fourth sub-elements completely surround said at least one conductor and threadedly engage all of said at least two threaded conduits.

* * * * *